April 10, 1945.   E. L. FANTON ET AL   2,373,238
WOOL CLEANING MACHINE
Filed May 28, 1942   2 Sheets-Sheet 2

INVENTORS
EMILIO LUIS FANTON, AND
ROBERTO ROMAN FANTON
BY Stevens and Davis
ATTORNEYS Patented Apr. 10, 1945

2,373,238

UNITED STATES PATENT OFFICE 2,373,238

WOOL CLEANING MACHINE

Emilio Luis Fanton and Roberto Roman Fanton, Buenos Aires, Argentina

Application May 28, 1942, Serial No. 444,896

5 Claims. (Cl. 19—81)

The present invention refers to a new wool cleaning machine, and its main object is the provision of a new machine of this kind, for cleaning wool of animal origin and for taking away therefrom the foreign matter contained therein and, in particular, the clover seeds.

As it is well known, many difficulties have been experienced up to the present for separating, particularly the small seeds, from the wool of animal origin; and it is the principal feature of the machine of the present invention, to accomplish such work and, in particular, the extraction from the wool of the clover seeds in an advantageous way as compared with heretofore existing machines.

The wool cleaning machine in accordance with the present invention comprises, as its main features, an oscillating raking mechanism formed of a plurality of knife supports each one provided with a number of knives or blades and a grid shaped element through which the said blades pass, the two parts thus cooperating to rake the wool; the said grid shaped element being provided, at each side, with a bar or plate, carrying on its lower edge a number of hooks, fish hook shaped, adapted for cooperating with the said knives or blades, and of means for cleaning up the said knives or blades after each advance and return movement when they oscillate from one end to the other of the grid shaped element.

One object of the present invention is to provide the knives of the raking mechanism of the said wool cleaning machine, with a triangle shaped sharpened point, slightly lengthened and also slightly diverted towards one side of the knife body.

Another object of the herein disclosed wool cleaning machine, is to provide the knife supports, each one made with a segment shaped plate which is provided, at one of its surfaces, with a plate forming a pocket like receptacle for the knives or blades, the arrangement being such that the knives or blades are mounted adjustably in the said pocket formations, by means of an adjusting and fixing screw along a groove made in each of the said pocket formations.

Another object of the wool cleaning machine of the present invention consists in providing an arrangement according to which, the plurality of knife or blade supports are mounted on an oscillating frame, the lower portion of which is so constructed that it acts in the way of a counter weight for the said knife supports and for the knives or blades they carry, and to provide a proper mechanism for the displacement of the said frame with an oscillating motion, which movement has its origin in the rotation of an electric motor or any other equivalent driving means.

Another object of the wool cleaning machine of the present invention resides in that the grid shaped element which cooperates with the knives or blades, is formed by a plurality of curved bars, separated one from the other by a small distance, that the knives, when projecting therebetween, pass therethrough very closely and the said grid shaped element forms the bottom of a hopper provided at the top of the machine.

Still another object of the wool cleaning machine of the present invention consists in that in the interior of the hopper and at each end thereof, there is provided a plate or bar transversally disposed and a number of slots in the front and rear walls for adjustably fixing the said transversally disposed bars or plates, which comprise in their lower edges a number of hooks of fish hoop shape, with their shaped ends directed towards the interior of the hopper and adapted to cooperate with the wool raking knives or blades.

Finally, still one other object of the wool cleaning machine of the present invention, resides in that the means for cleaning the knives or blades after each stroke of their oscillatory motion, comprise a comb-like member made of rubber or any other suitable material, and a support part for the said comb-like member, the arrangement of the parts being such that the knives, after each movement, pass between the comb teeth and these take away any dirt and the wool lints that may have adhered to the knives or blades.

In order that the invention may be clearly understood and easily carried into practice, a preferred embodiment thereof will now be fully described; the description will be taken with reference to the accompanying drawings in which:

Figures 3 and 4 are detail front and side views respectively, of a knife support with the knives mounted thereon and a portion of the grid shaped element through which pass the said knives.

Figure 5 is a detail, top viewed, of the comb-like member for cleaning the knives.

All through the drawings the same reference numerals indicate the same or similar parts.

Figure 1:
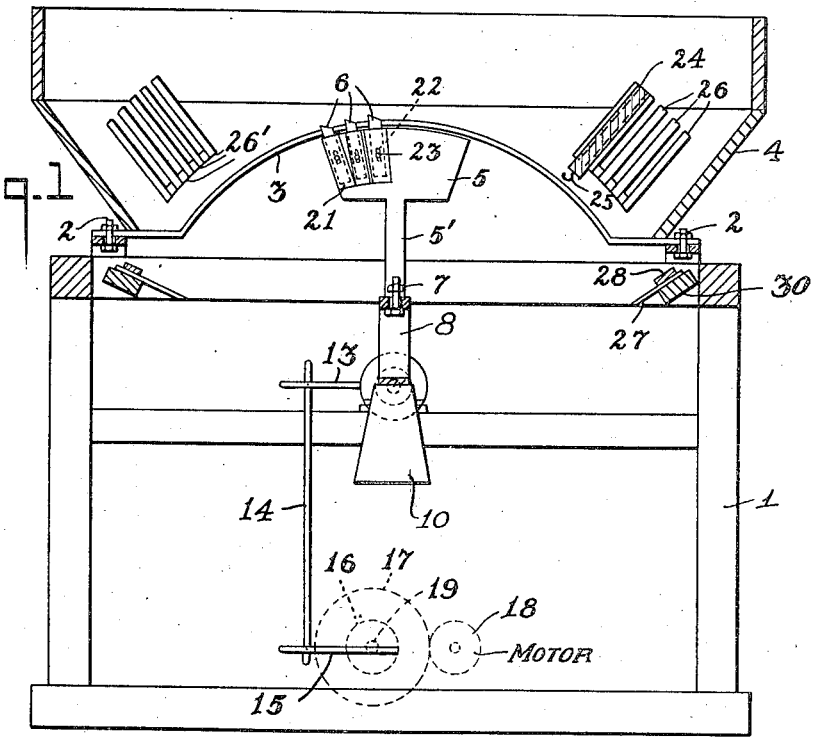
Figure 1 is a section front view.
Figure 2:
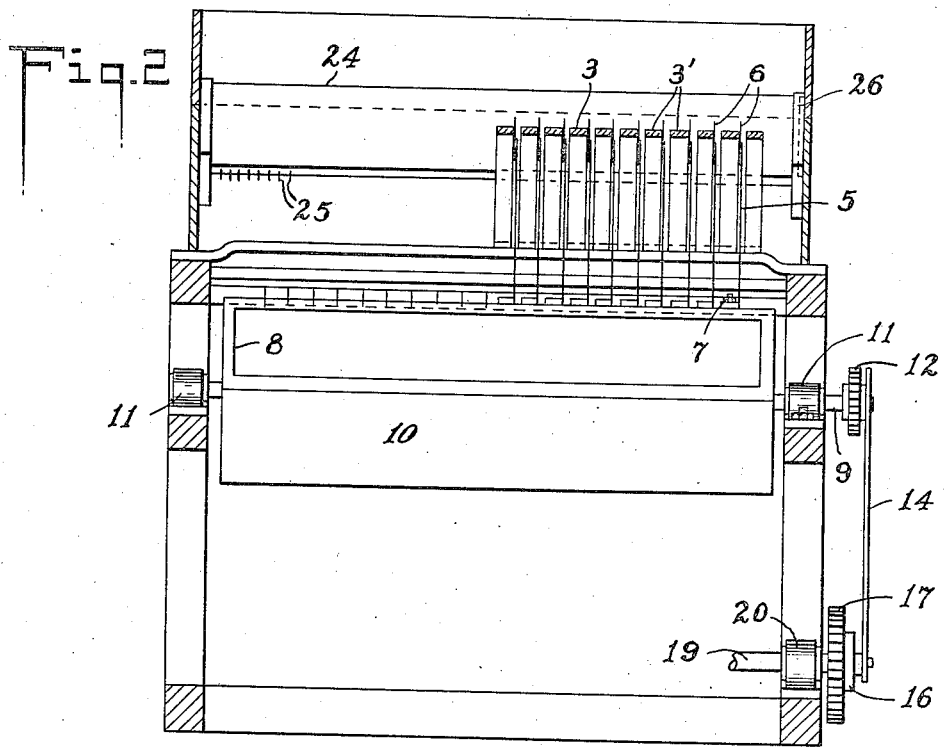
Figure 2 is a section side view of a machine embodying the present invention.

The wool cleaning machine in accordance with the present invention, and as it is illustrated on the drawings, comprises a frame 1 upon which is mounted, by means of, for instance, screws 2.

a grid shaped element 3 formed of a number of curved bars 3', separated from each other a very small space apart. The grid shaped element constitutes, as it has already been said, the bottom of the hopper 4 that is placed at a convenient point on frame 1.

The main part of the machine is constituted by an oscillating raking mechanism which comprises a plurality of knife supports, each one formed by a plate 5, segment shaped, and provided with a number of knives or blades 6 which project through the grid shaped element 3; a full description of the arrangement and construction thereof will be given.

Each knife support 5 comprises an extension 5' for being secured with the use of a screw 7 or by any other convenient means, to an oscillating frame 8 supported on a shaft 9. The lower part 10 of each knife support constitutes a counter weight therefor.

Shaft 9 is mounted on bearings 11 fixed to the frame 1 and has, at one end, a wheel or disc 12 in the external surface of which is fixed a rod 13 which, through pivotal connection to the connecting rod 14, connects with another rod 15 secured to the external surface of a disc 16, fixed to a gear 17 that meshes with a gear 18 moved by an electric motor or any other equivalent, not shown.

The disc 16 and the wheel 17 are mounted, preferably, on a common shaft 19 turning in bearings 20.

The arrangement of this driving transmission mechanism is so disposed that, through the rods 15, 14, 13, oscillatory motion is imparted to the frame 8 and this frame, in turn, moves the knives or blades 6 along the curved slots formed by the grid shaped element 3, until they almost occupy a position which is horizontal below the said element.

Figures 4, 5:
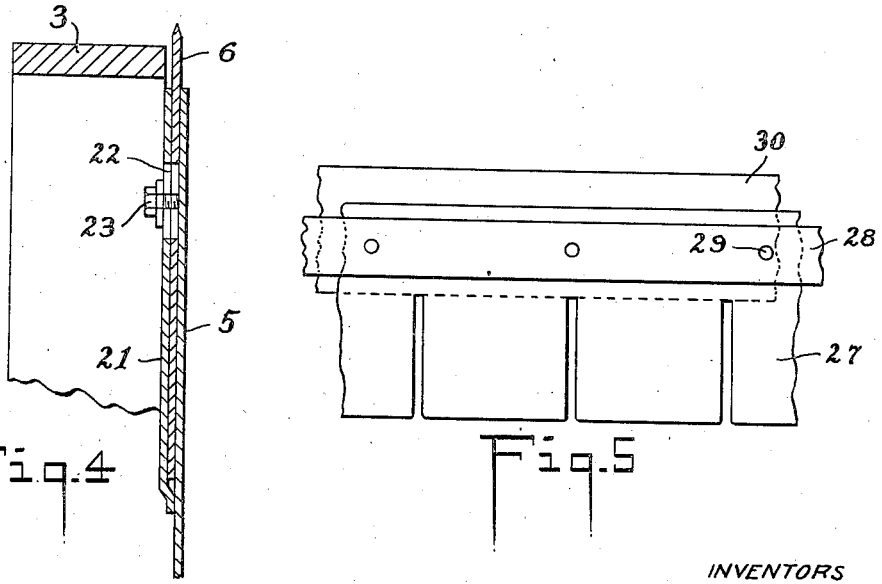

Knives 6 are fixed to one of the surfaces of the knife supports 5 by means of plates which define with the latter sheathes or pockets 21, each one being provided with a slot 22 for adjusting the knives there along by means of an adjusting and securing screw 23 (Figures 3 and 4).

Each knife support, preferably, is provided with six knives or blades and they are so mounted thereon, that their sharpened triangle shaped points project from the segmental knife support, and extend through the grid shaped element 3 to the interior of the hopper 4; their position is such, that the sharpened points of three of the six knives are directed towards one side of the machine, while the other three are directed towards the opposite side.

Within the hopper 4, along each side thereof, there is provided a cross plate 24 carrying at its lower edge a plurality or hooks, fish hook shaped, the sharpened points of which are directed towards the center of the hopper (Figure 1) and cooperate with the knives 6 in combing the wool. For securing the cross plates 24 in the desired position in the inner surfaces of the front and rear walls of the hopper 4, there are provided slots adapted for receiving the ends of said plates, the slots being formed, preferably, with parallel strips 26 which, near their lower ends, define stops 26'; the said stops are necessary for retaining the plates 24 in a position such that the hooks 25 will be positioned at a predetermined distance from the upper surface of the grid shaped element 3 and from the points of the knives 6.

The wool cleaning machine in accodance with the present invention comprises, finally, means for cleaning the knives 6, which means consist of a pair of comb elements 27, made of rubber or similar suitable material. Each element is fixed by means of a strip 28 and rivets or screws 29 to a cross bar 30. These bars are conveniently mounted on the sides of the upper portion of frame 1, at a lower level than that to which is placed the grid element 3, but in such a position that the comb members 27 will, in a sufficient extent, project within the machine so as to reach the knives 6 or stand in their path. The arrangement is such that the comb elements wipe from the knives any dirt or wool lint that may have adhered thereto, when said knives reach either end of their path of movement.

The operation of the wool cleaning machine in accordance with this invention, and according to the description just given, is as follows:

After assembling the machine and inserting the plates 24 in the grooves 26 in the desired position and having filled the hopper 4 with the wool that is to be cleaned, carded and combed, the machine is set in operation. The mechanism 18, 17, 16, 15, 14, 13, 12 serves to impart to the member 8 and the latter to the blade carrier 5 holding blades 6, an oscillatory motion so that the blades thus describe a semi-circular path. These blades, the tips of which extend through the grid member 3 and cooperate with the hooks or fishhooks 25 of the cross plates 24, comb the wool disposed above the grid member 3, loosen it up, and drag the floss or fine fibres through the grid, allowing them to drop into a suitable container conveniently disposed within the frame 1. Since the various bars comprising the grid member 3 are separated from each other to such a slight extent and the blades pass quite closely betweeen them, practically all of whatever extraneous particles or impurities are present in the wool remain above the grid member 3 and accumulate at the sides or along the outer side of the cross plates 24 whence they are removed by hand. The few impurities that pass through the grid are very minor or very small and can be removed when the wool is washed in suitable washers which completely eliminate any adhering earth, etc. that may remain after the wool has been cleaned and carded by the machine.

The blades 6 in each movement from one side of the machine to the other pass through the whole of grid 3 and issue therefrom at each side, occupying a horizontal position and passing between the teeth of the comb member for removal of the floss that has not spontaneously dropped off and for removing also any dirt that may remain adhering to each blade.

It will be obvious that the present invention is not limited to the example shown and described of carrying it into effect, and that many amendments and modifications may be introduced in the construction and details, such as, for instance, to provide an alternative driving mechanism for effecting the oscillatory movement of the knives, and other such changes, without departing from the scope of the invention which is clearly set forth in the annexed claims.

What we claim is:

1. A wool cleaning machine comprising, a hopper to receive the wool to be cleaned and having a convex bottom comprised of an arcuate grid having therein a plurality of closely spaced circumferentially extending parallel slots, groups of knives, each group extending from below the grid through a slot therein into the hopper, a knife support for each group of knives, means for simultaneously oscillating all of said knife supports to move the groups of knives in an arc concentric to that of the grid but of greater amplitude whereby said knives engage and comb the wool in said hopper and pull the combed wool through the slots in said hopper, a curved hook disposed in the path of each group of knives on each side of the grid, and means in the path of oscillation of each group of knives nearer the point of change of direction than the respective hook for wiping said knives.

2. A wool cleaning machine as claimed in claim 1 in which the knives are provided with sharpened triangular points slightly lengthened and diverted toward one side of the knife body.

3. A wool cleaning machine as claimed in claim 1 in which each knife support includes a segment shaped plate having pockets therein for receiving the group of knives and means for adjustably holding each knife in a position extending from the respective pocket.

4. A wool cleaning machine as claimed in claim 1 in which the knife supports are counterweighted and in which the means for oscillating the supports comprises an electric motor and a transmission for converting rotatory to oscillatory motion.

5. A wool cleaning machine as claimed in claim 1 further comprising a plate to the lower edge of which each hook is attached and means for adjustably supporting the hook bearing plates with the hooks in registry with the respective groups of knives.

EMILIO LUIS FANTON.
ROBERTO ROMAN FANTON.